United States Patent [19]

Cuevas

[11] Patent Number: 5,685,559
[45] Date of Patent: Nov. 11, 1997

[54] STEERING WHEEL WITH AIR BAG MODULE

[75] Inventor: Jess A. Cuevas, Scottsdale, Ariz.

[73] Assignee: TRW Inc., Lyndhurst, Ohio

[21] Appl. No.: 636,541

[22] Filed: Apr. 25, 1996

[51] Int. Cl.⁶ .................................................. B60R 21/20
[52] U.S. Cl. .......................... 280/728.2; 280/731; 74/552; 411/5
[58] Field of Search ................... 280/731, 728.2, 280/736, 741, 728.1; 74/552; 411/5, 4, 3

[56] References Cited

U.S. PATENT DOCUMENTS

| | | | |
|---|---|---|---|
| 1,677,269 | 7/1928 | Burghart | 411/5 |
| 4,325,568 | 4/1982 | Clark et al. | 280/731 |
| 4,828,286 | 5/1989 | Fohl | 280/731 |
| 4,877,264 | 10/1989 | Cuevas | 280/731 |
| 4,913,461 | 4/1990 | Cuevas | 280/731 |
| 5,046,757 | 9/1991 | Sadler et al. | 280/731 |
| 5,277,442 | 1/1994 | Cuevas | 280/731 |
| 5,382,046 | 1/1995 | Cuevas | 280/728.2 |
| 5,398,963 | 3/1995 | Fohl | 280/731 |
| 5,433,472 | 7/1995 | Green et al. | 280/728.2 |
| 5,470,099 | 11/1995 | Williams | 280/728.2 |
| 5,480,184 | 1/1996 | Young | 280/731 |
| 5,547,213 | 8/1996 | Lang et al. | 280/731 |
| 5,584,501 | 12/1996 | Walters | 280/731 |
| 5,584,503 | 12/1996 | Lutz | 280/731 |
| 5,588,337 | 12/1996 | Milton | 74/552 |

FOREIGN PATENT DOCUMENTS

| | | | |
|---|---|---|---|
| 25 00 003 | 7/1975 | Germany | 280/731 |
| 4226101 | 2/1994 | Germany | |
| 2242871 | 10/1991 | United Kingdom | |

Primary Examiner—Brian L. Johnson
Assistant Examiner—Peter C. English
Attorney, Agent, or Firm—Tarolli, Sundheim, Covell, Tummino & Szabo

[57] ABSTRACT

A vehicle steering wheel assembly (20) includes an air bag module (24) connected with a frame (42) of a vehicle steering wheel (22). The module (24) includes an inflator (62), an air bag (64), and a mounting hub (66). An internal groove (184) in the mounting hub (66) receives resiliently deflectable tabs (208) on the inflator (62) to secure the inflator to the mounting hub. A mounting portion (240) of the air bag (64) is received in one section of an external groove (182) on the mounting hub (66). A base portion (262) of a guide ring (260) is received in another section of the external groove (182). A wall portion (266) of the guide ring retains the mounting portion (240) of the air bag (64) in the groove, to secure the air bag to the mounting hub. The steering wheel frame (42) has a plurality of tabs (164) which are deformed into slots (162) in the mounting hub to secure the module (24) to the frame. A single fastener (40) secures the mounting hub (66) and thereby the module (24) to the vehicle steering shaft (26).

17 Claims, 4 Drawing Sheets

STEERING WHEEL WITH AIR BAG MODULE

BACKGROUND OF THE INVENTION

1. Technical Field

The present invention relates to an apparatus for helping to protect an occupant of a vehicle and to a method of assembling the apparatus. In particular, the present invention relates to an apparatus which includes an air bag module connected with a vehicle steering wheel, and to a method of assembling the air bag module and the vehicle steering wheel.

2. Description of the Prior Art

An inflatable vehicle occupant protection device, such as an air bag, is inflated to help protect an occupant of a vehicle. The air bag is inflated by inflation fluid from an inflator. The inflated air bag is located between the occupant and a vehicle part to help protect the vehicle occupant from forcefully striking or being struck by the vehicle part.

The air bag and the inflator are typically connected with each other and thereafter mounted as a unit, commonly known as an air bag module, on the vehicle. An air bag module for helping to protect a driver of a vehicle is typically mounted in or on the steering wheel of the vehicle.

An air bag module for helping to protect a driver of a vehicle is typically attached to the steering wheel after the steering wheel is mounted on a steering shaft of the vehicle. Attaching the module to the steering wheel in this manner, that is, after the steering wheel has already been mounted on the vehicle, requires assembly steps which can be cumbersome.

In a typical air bag module, the air bag and the inflator are supported on a module plate with fasteners and a retainer. The fasteners extend through openings in the air bag, the inflator, the module plate and the retainer. During assembly of the module, at least some of the openings in these components must be aligned with each other for insertion of the fasteners.

SUMMARY OF THE INVENTION

The present invention is a module comprising an inflatable vehicle occupant protection device and an actuatable inflator which, upon actuation, provides inflation fluid to inflate the inflatable device. The module includes a mounting hub for connection with a steering shaft of a vehicle. First means for attaching the inflator to the mounting hub at a first location on the mounting hub includes means for defining a first groove in one of the mounting hub and the inflator. The first means for attaching also includes a resiliently deflectable tab on the other of the mounting hub and the inflator, which is receivable in the first groove. Second means for attaching the inflatable device to the mounting hub at a second location on the mounting hub includes a member and means for defining a second groove in the mounting hub. A mounting portion of the inflatable device is receivable in a first section of the second groove. The member has a base portion receivable in a second section of the second groove and a wall portion retaining the mounting portion of the inflatable device in the first section of the second groove.

In a preferred embodiment, the means for attaching the inflator to the mounting hub comprises a plurality of resiliently deflectable tabs which deflect from an initial position upon relative movement of the inflator and the mounting hub toward a predetermined relative position. The tabs return toward the initial position in the groove upon movement of the inflator and the mounting hub into the predetermined relative position thereby to maintain the inflator and the mounting hub in the predetermined relative position.

The module is receivable in a tubular portion of a steering wheel frame. An end portion of a first one of the mounting hub and the tubular portion of the frame is deformable into engagement with an end portion of a second one of the mounting hub and the tubular portion of the frame to secure the mounting hub for movement with the frame.

The present invention also is a method of assembling a vehicle steering wheel and an air bag module. The method includes the steps of: providing a vehicle steering wheel including a frame having a tubular portion; providing a mounting hub which is connectable with a vehicle steering shaft and which includes a tubular portion; attaching an inflator within the tubular portion of the mounting hub; attaching an air bag to the tubular portion of the mounting hub; positioning the mounting hub in the tubular portion of the steering wheel frame; and retaining the mounting hub in the steering wheel frame by deforming an end portion of a first one of the tubular portion of the frame and the tubular portion of the mounting hub against an end portion of a second one of the tubular portion of the frame and the tubular portion of the mounting hub.

BRIEF DESCRIPTION OF THE DRAWINGS

Further features and advantages of the present invention will become apparent to those skilled in the art to which the present invention relates from reading the following specification with reference to the accompanying drawings, in which.

DESCRIPTION OF A PREFERRED EMBODIMENT

Figure 6:
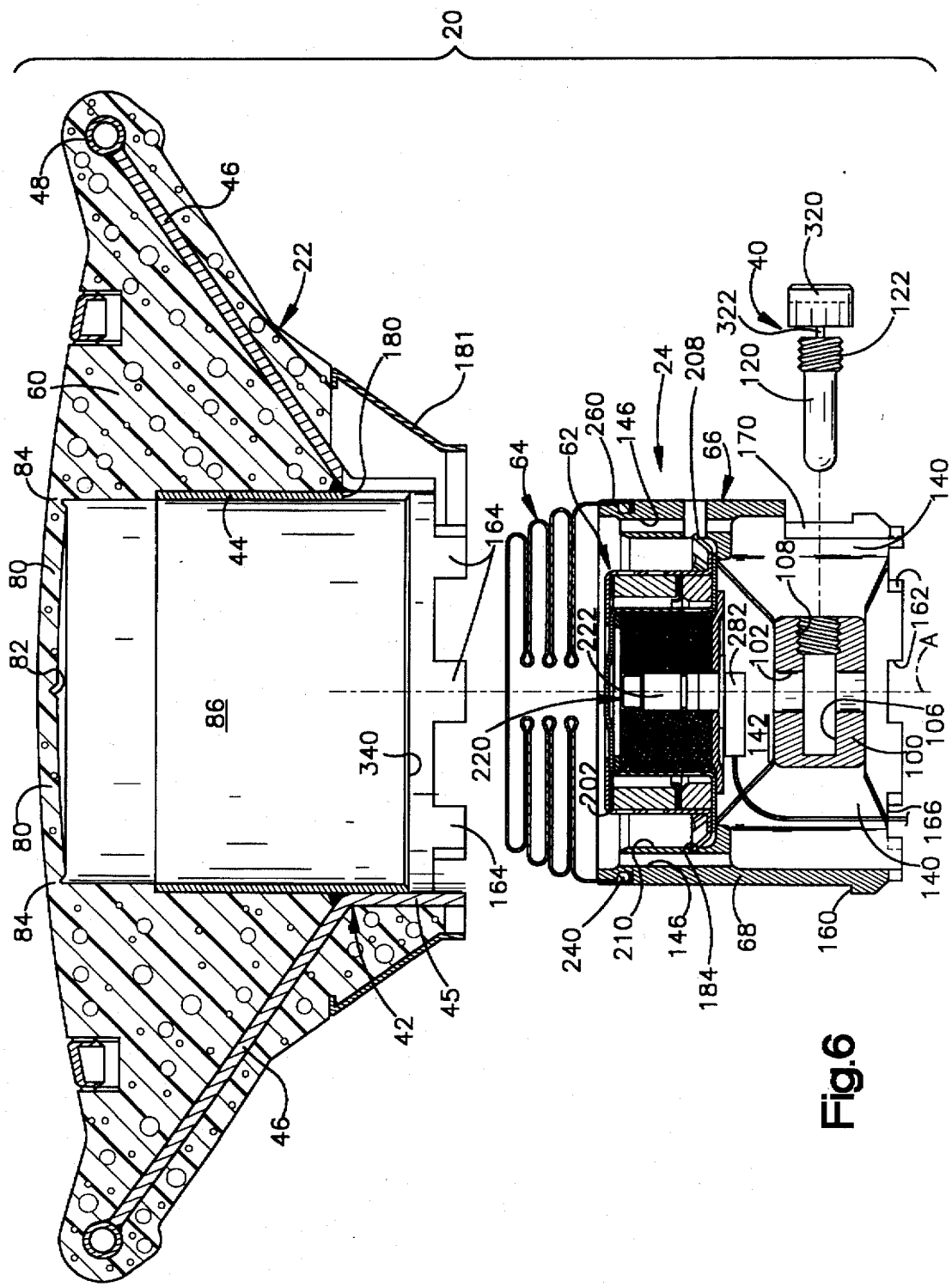
FIG. 6 is a view illustrating an assembly step of inserting the air bag module of FIGS. 4 and 5 into the vehicle steering wheel.

A vehicle steering wheel assembly 20 (FIGS. 1 and 6) which is constructed in accordance with the present invention includes a steering wheel 22 and an air bag module 24. The steering wheel assembly 20 is connected to a steering shaft 26 (FIG. 1) which is located within a steering column 28 of the vehicle.

The steering wheel assembly 20 is provided as a unit for connection to the steering shaft 26. The steering wheel assembly 20 is secured to the steering shaft 26 by a fastener 40 (best seen in FIG. 6), in a manner described below. The steering wheel assembly 20, including the steering wheel 22, is rotatable with the steering shaft 26 about a longitudinal central axis A of the steering shaft to control the direction of vehicle travel.

The steering wheel 22 includes a frame 42. The frame 42 is a metal structure and includes a tubular central portion 44 which is welded to a ring 45. A cylindrical cavity 86 (FIG. 6) is defined by the tubular central portion 44 of the frame 42. A plurality of spokes 46 extend outward from the ring 45 and are welded to a rim 48 of the steering wheel 22. The rim 48 is substantially circular in shape and is centered on the axis A.

The steering wheel frame 42 includes a plurality of circumferentially spaced tabs 164 (FIG. 6) disposed in a circular array extending around the lower end portion of the ring 45 of the steering wheel frame 42. The tabs 164 extend axially downward (as viewed in FIG. 6) prior to assembly of the air bag module 24 with the steering wheel frame 42.

Figure 1:
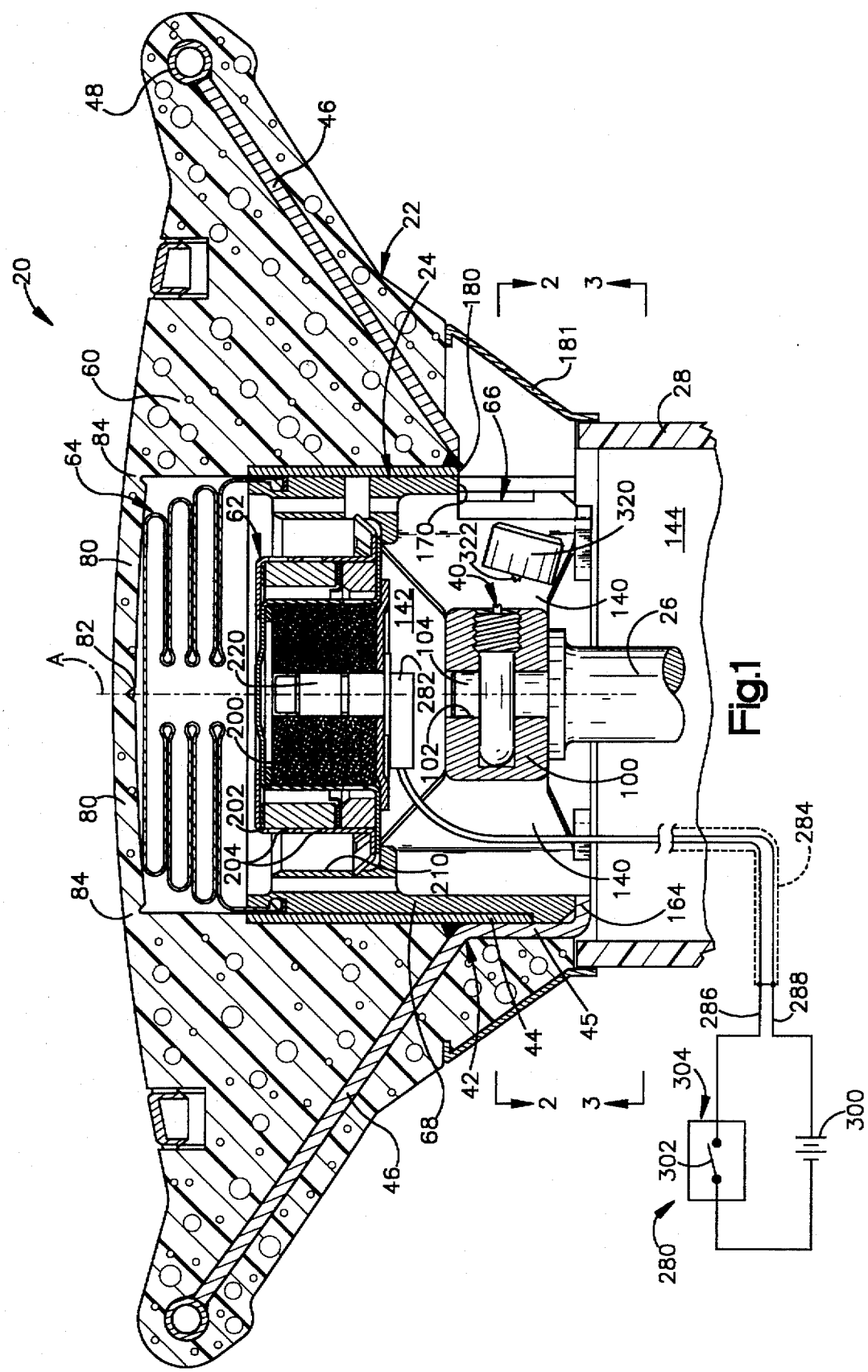
FIG. 1 is a schematic view of a vehicle steering wheel assembly which is constructed in accordance with the present invention.

The steering wheel 22 also includes a plastic cover 60 encapsulating a majority of the exterior of the frame 42. The cover 60 includes a pair of centrally located deployment door panels 80. The deployment door panels 80 are held in initially closed positions, as shown in FIG. 1, by a rupturable central section 82 of the cover 60. The deployment door panels 80 are pivotable outward at hinge portions 84.

The air bag module 24 includes an inflator 62 (best seen in FIG. 4) and an inflatable vehicle occupant protection device 64 of the type commonly referred to as an air bag. The inflator 62 and the air bag 64 are attached to a mounting hub 66 of the air bag module 24. The air bag module 24 is attached to the steering wheel 22 by the mounting hub 66, in a manner described below, to form the steering wheel assembly 20.

Figure 2:
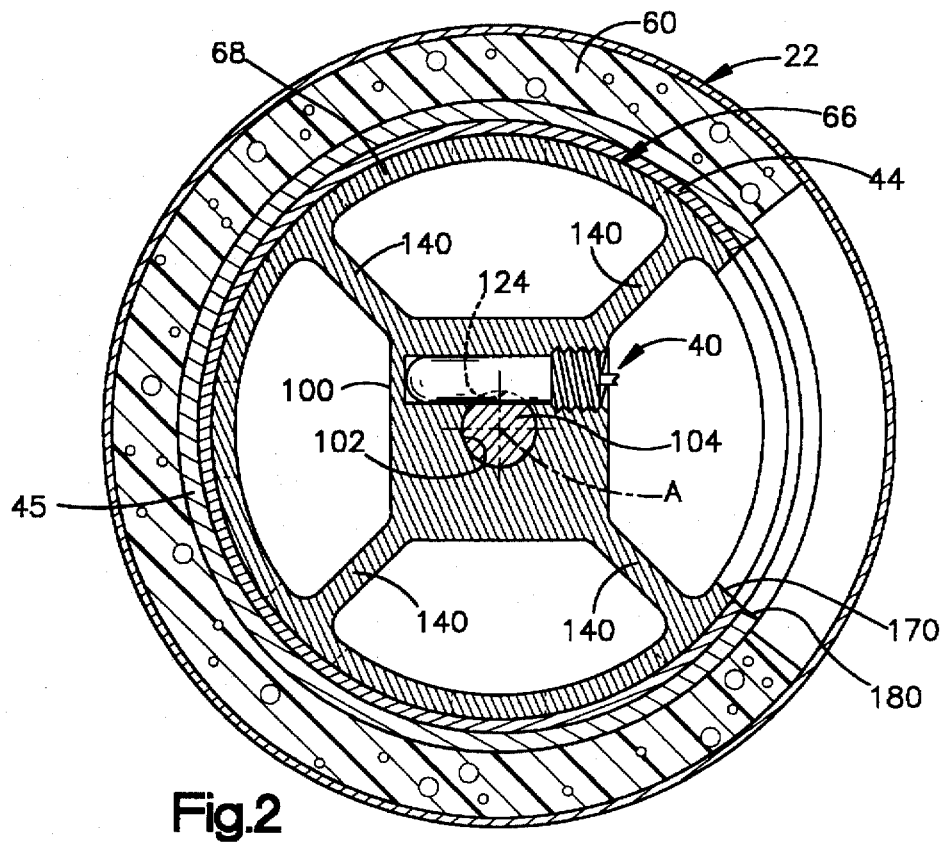
FIG. 2 is a sectional view of a portion of the steering wheel assembly of FIG. 1, taken generally along line 2—2 of FIG. 1.
Figure 3:
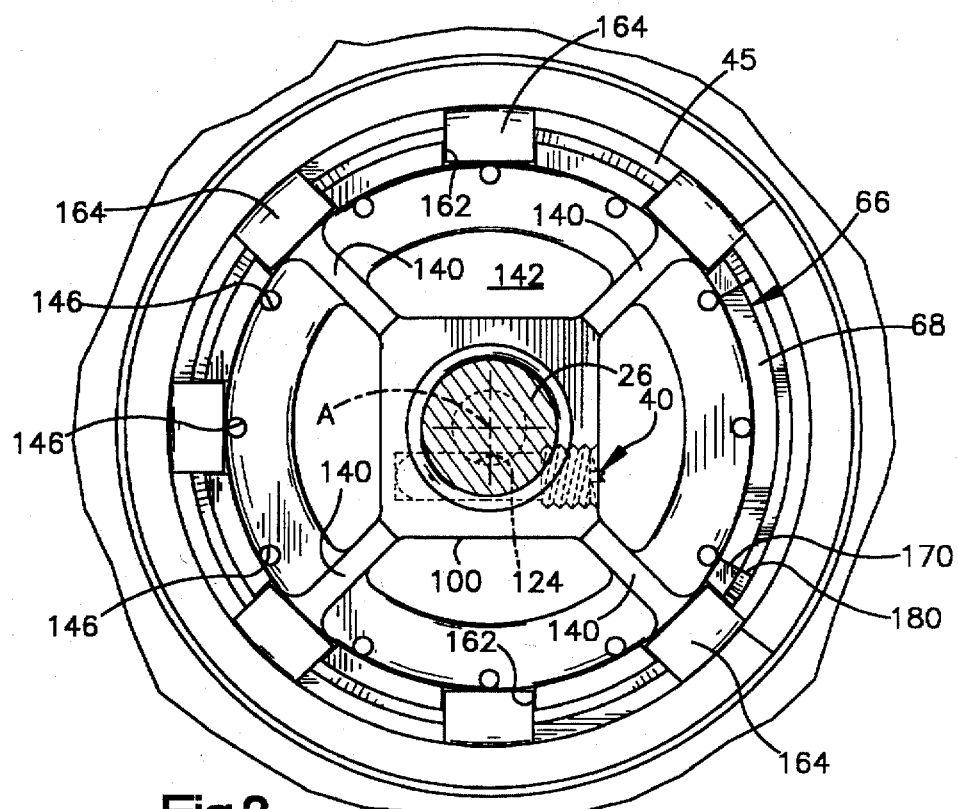
FIG. 3 is a bottom view of a portion of the steering wheel assembly of FIG. 1, taken along line 3—3 of FIG. 1.
Figure 5:
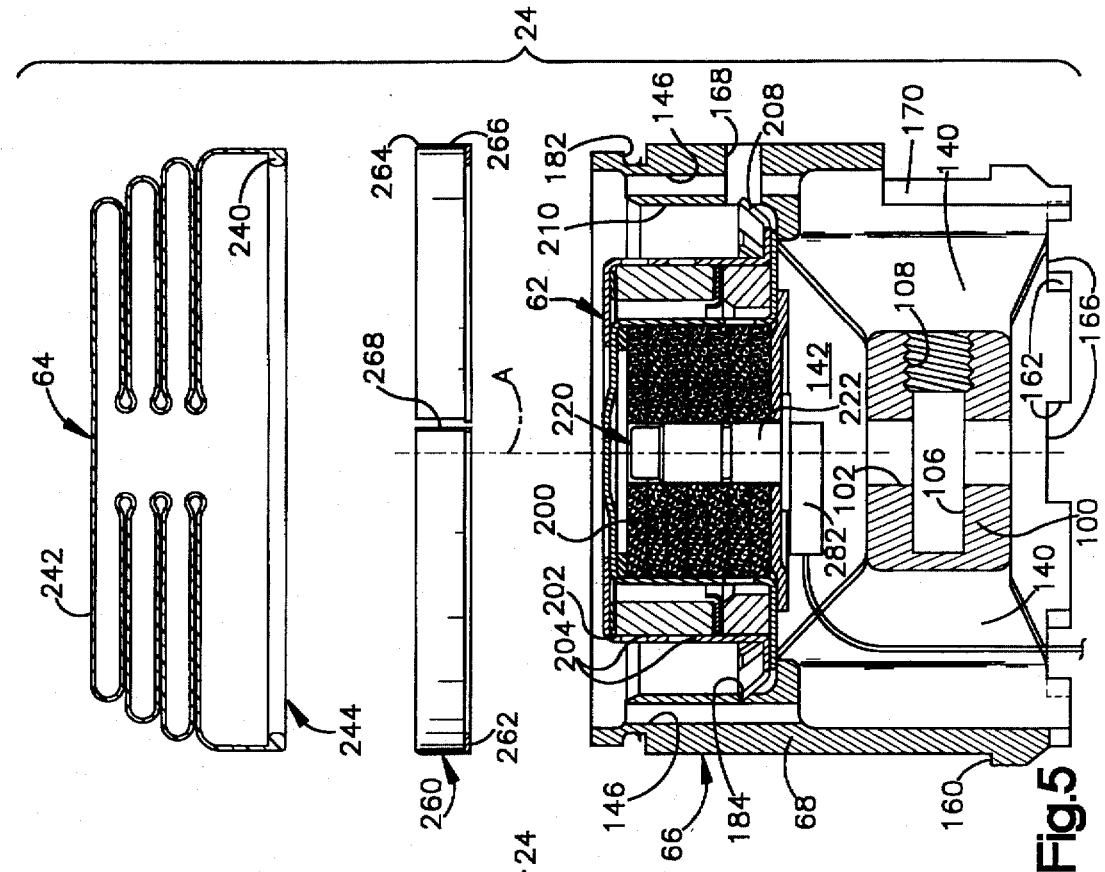
FIGS. 4 and 5 are sectional views illustrating sequential assembly steps of an air bag module which forms a part of the steering wheel assembly of FIG. 1.

The mounting hub 66 includes a substantially tubular portion 68 and a radially spaced apart central portion 100 (FIGS. 2 and 3). Four connector arms 140 (FIGS. 2–5) extend radially and axially between the central portion 100 and the tubular portion 68 of the mounting hub 66. The connector arms 140 interconnect the central portion 100 and the tubular portion 68 of the mounting hub 66. The central portion 100 has an axially extending opening 102 (FIGS. 4 and 5) and a fastener opening 106 which extends transversely through the opening 102. The fastener opening 106 is defined at one end by a threaded surface portion 108.

The tubular portion 68 of the mounting hub 66 defines within its lower end portion a chamber 142 in which the central portion 100 is located. The chamber 142 in the mounting hub 66 is in fluid communication with a chamber 144 (FIG. 1) defined by the steering column 28 when the mounting hub is connected with the steering shaft 26 as described below. The chambers 142 and 144 store a volume of ambient air that may be aspirated into the air bag 64 during inflation of the air bag. A plurality of vents 146 (FIGS. 3 and 4) extend longitudinally through the material of the tubular portion 68 of the mounting hub 66. The vents 146 are in fluid communication with the chamber 142.

An inner shoulder flange 148 (FIG. 4) on the mounting hub 66 extends radially inward from the tubular portion 68 in an axially central region of the mounting hub 66. A deflector portion 210 of the mounting hub 66 extends axially upward from the inner shoulder flange 148. The mounting hub 66 also has an outer shoulder flange 160 at its lower end portion (as viewed in FIGS. 4 and 5). The outer shoulder flange 160 extends circumferentially around the tubular portion 68 of the mounting hub 66.

A plurality of axially extending slots 162 (FIGS. 4 and 5) are disposed in a circular array extending around the lower end portion of the tubular portion 68 of the mounting hub 66. Each slot 162 is circumferentially spaced from adjacent slots 162 and is at least partially defined by a radially extending upper end surface 166.

An external groove 182 is formed near an upper end (as viewed in FIG. 4) of the tubular portion 68 of the mounting hub 66. The external groove 182 is continuous and extends circumferentially around an outer cylindrical surface of the mounting hub 66.

Figure 4:
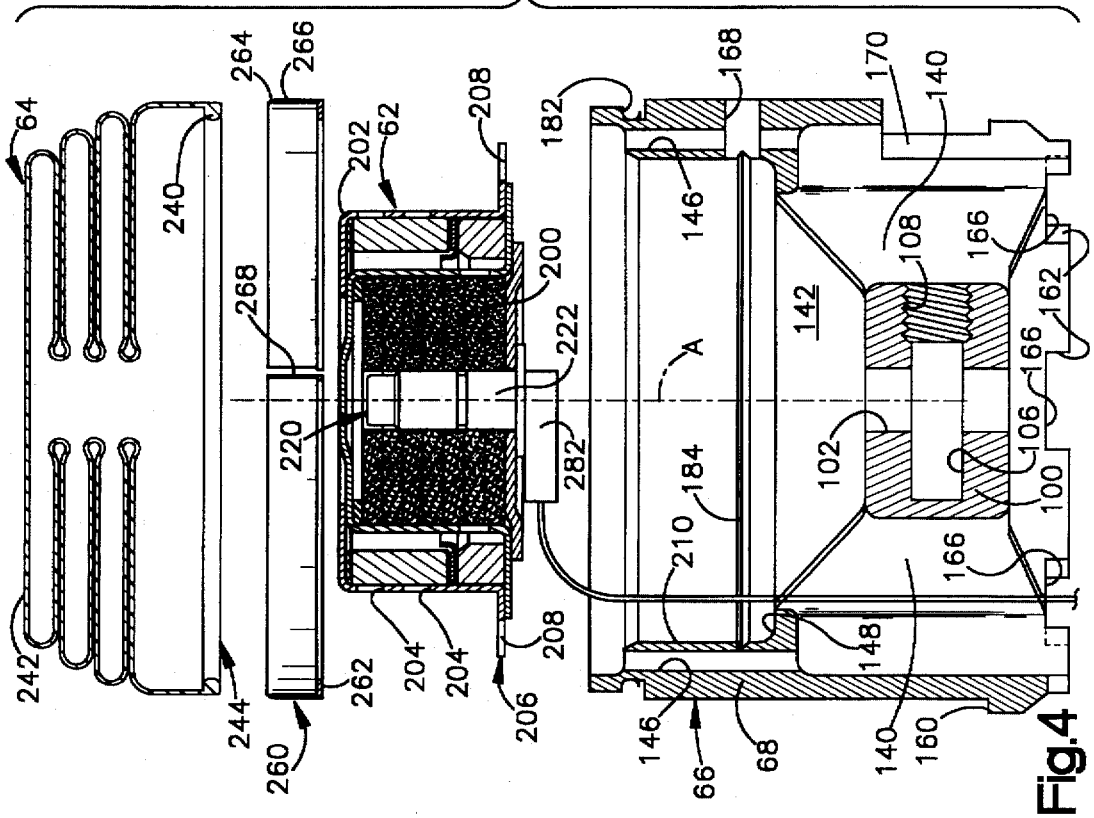

The mounting hub 66 also includes an internal groove 184 (FIG. 4) which is spaced axially downward from the external groove 182 at a location slightly above the inner shoulder flange 148, as viewed in FIG. 4. The internal groove 184 is substantially continuous and extends circumferentially around an inner cylindrical surface of the mounting hub 66. The internal groove 184 passes through and is discontinuous at a view port 168 (FIG. 4) in the mounting hub 66. The view port 168 is provided so that a person or robot may determine, during assembly of the steering wheel assembly 20, the presence or absence of the inflator 62 in the mounting hub and whether the inflator is in a proper position relative to the mounting hub 66.

The inflator 62 is actuatable as described below to provide inflation fluid for inflating the air bag 64. The inflator 62 contains an ignitable gas generating material 200 (FIG. 4) for generating, upon ignition, a large volume of inflation fluid in the form of gas for inflating the air bag 64. The gas generating material 200 may have any suitable composition and configuration known in the art. The inflator 62 may alternatively contain a quantity of pressurized inflation fluid, a combination of pressurized inflation fluid and ignitable material for heating the inflation fluid, or a mixture of gases in which at least one of the mixture of gases is combustible.

The inflator 62 has a relatively short, generally cylindrical housing 202 centered on the axis A. The housing 202 contains the ignitable gas generating material 200. The housing 202 has a plurality of gas outlet openings 204.

A mounting flange 206 is located on the housing 202 of the inflator 62 near one end of the housing. The mounting flange 206 includes a plurality of discrete resiliently deflectable tabs 208. The tabs 208 are disposed in a circular array extending around the outer periphery of the mounting flange 206 and project radially outward from the housing 202.

The inflator 26 includes an electrically actuatable initiator 220 which has an elongate cylindrical casing 222 extending axially within the housing 202. The initiator 220 includes a pair of electrodes (not shown) external to the lower end of the housing 202. A pyrotechnic material in the casing 222 is ignitable in a known manner upon the flow of electric current between the electrodes. The pyrotechnic material in the initiator 220 may have any suitable composition and configuration known in the art. When the pyrotechnic material is ignited, it produces hot combustion products which rupture and emerge from the casing 222 to ignite the gas generating material 200.

The air bag 64 (FIGS. 4 and 5) has a relatively large inflatable portion 242. An inlet portion 244 of the air bag 64 includes a molded bead 240 for securing the air bag to the mounting hub 66 in a manner described below. The air bag 64 is preferably made from a fabric material such as woven nylon. The air bag 64 can alternatively be made from non-woven material, such as plastic film. The use of plastic film, in particular, would require inflation fluid vents to be formed in the air bag 64, as is known in the art.

The air bag module 24 also includes a guide ring 260 (FIG. 4) for securing the air bag 64 to the mounting hub 66 and for guiding movement of the mounting hub into the steering wheel frame 42 during assembly of the steering wheel assembly 20. The guide ring 260 is an annular member having a split-ring configuration including an opening 268 that allows circumferential and diametrical expansion for attaching the guide ring around the mounting hub 66. The guide ring 260 is preferably made from a relatively low friction material, such as polytetrafluoroethylene. The guide ring 260 has an L-shaped cross-sectional configuration, as seen in a plane extending along and radially from the axis A, including a base portion 262 and a wall portion 266. The wall portion 266 of the guide ring 260 has a chamfered upper or leading edge 264.

In assembly of the air bag module 24, the inflator 62 is placed at least partially into the tubular portion 68 of the mounting hub 66. The mounting flange 206 of the inflator 62 engages an upper end surface of the deflector portion 210 of the mounting hub 66. The inflator 62 is moved axially into the tubular portion 68 of the mounting hub 66, in a downward direction as viewed in FIGS. 4 and 5. The tabs 208 on the mounting flange 206 on the inflator 62 deflect radially inward and axially backward relative to the direction of movement of the inflator, as the tabs slide axially along the inner periphery of the deflector portion 210 of the mounting hub 66.

When the inflator 62 is in a predetermined position within the tubular portion 68 of the mounting hub 66, the bottom of the inflator housing 202 engages the inner shoulder flange 148 on the mounting hub 66. This engagement blocks further axial movement of the inflator 62 relative to the mounting hub 66, in a downward direction as viewed in FIGS. 4 and 5.

When the inflator 62 is in the predetermined position within the tubular portion 68 of the mounting hub 66, at least one and preferably all of the tabs 208 resiliently expand radially outward into the internal groove 184 in the mounting hub. The resilience of the tabs 208 prevents the tabs from coming out of the groove 184 and retains the housing 202 of the inflator 62 against the inner shoulder flange 148 of the mounting hub 66. The engagement of the tabs 208 on the inflator 62 in the groove 184 on the mounting hub 66 blocks axial movement of the inflator relative to the mounting hub in an upward direction as viewed in FIGS. 4 and 5.

The air bag 64 is then attached to the mounting hub 66 by placing the mounting bead 240 of the air bag over the upper end of the mounting hub, as viewed in FIG. 4. The mounting bead 240 of the air bag 64 is received in a first or upper section of the external groove 182 in the mounting hub 66. The wall portion 266 of the guide ring 260 is, thereafter, placed around the mounting bead 240 of the air bag 64. The base portion 262 of the guide ring 260 is received in a second or lower section of the outer groove 182. The resilience of the guide ring 260 retains the mounting bead 240 of the air bag 64 in the groove 182.

The assembled air bag module 24 is then inserted into the cavity 86 (FIG. 6) in the tubular central portion 44 of the frame 42 of the steering wheel 22. Specifically, the air bag module 24 is moved axially in an upward direction as viewed in FIG. 6 into the steering wheel frame 42. The chamfered leading edge 264 of the wall portion 266 of the guide ring 260 centers and guides the air bag module 24 as it moves into the tubular central portion 44 of the steering wheel frame 42.

The mounting hub 66 and the guide ring 260 are sized to have substantially the same outside diameter, when assembled together, and to fit closely within the tubular central portion 44 of the steering wheel frame 42. This close fit forces the wall portion 266 of the guide ring 260 radially inward against the mounting bead 240 of the air bag 64. The tubular central portion 44 of the steering wheel frame 42 thus clamps the wall portion 266 of the guide ring 260 and the mounting bead 240 of the air bag 64 against the tubular portion 68 of the mounting hub 66. This clamping retains the mounting bead 240 in the groove 182 in the mounting hub 66.

When the air bag module 24 is thus disposed in the steering wheel frame 42, the outer shoulder flange 160 on the mounting hub 66 engages a lower end portion 340 (FIG. 6) of the tubular central portion 44 of the steering wheel frame. This engagement limits axial upward movement (as viewed in FIG. 1) of the mounting hub 66, and thereby the air bag module 24, relative to the steering wheel frame 42.

The air bag module 24 is then secured to the steering wheel 22 by bending the tabs 164 on the steering wheel frame 42 radially inward into the slots 162 in the mounting hub 66. The tabs 164 engage the radially extending end surfaces 166 of the slots 162. The engagement of the tabs 164 in the slots 162 blocks rotational movement of the air bag module 24 relative to the steering wheel frame 42. The engagement of the tabs 164 in the slots 162 also blocks axial movement of the air bag module 24 relative to the steering wheel frame 42, in a downward direction as viewed in FIGS. 1 and 4–6.

The steering wheel assembly 20, including the air bag module 24, is then secured to the steering shaft 26. A mounting portion 104 (FIG. 1) of the steering shaft 26 is inserted axially into the opening 102 in the central portion 100 of the mounting hub 66. The mounting hub 66 and the steering wheel frame 42 include respective access ports 170 and 180 through which the fastener 40 is inserted in a right to left direction as viewed in FIGS. 1 and 6. The fastener opening 106 in the central portion 100 of the mounting hub 66 receives a body portion 120 (FIG. 6) of the fastener 40. An externally threaded portion 122 of the fastener 40 is screwed into the internally threaded portion 108 of the fastener opening 106. The body portion 120 of the fastener 40 fits into a recess 124 (FIG. 2) in the mounting portion 104 of the steering shaft 26 to retain the mounting hub 66 and the steering wheel 22 on the steering shaft 26. A port cover 181 (FIG. 1) on the steering wheel 22, which normally hides the access ports 170 and 180, is deflectable during assembly to permit insertion of the fastener 40.

When the steering wheel assembly 20 is attached to the steering shaft 26 in the vehicle, the inflator 62 is connected with an electric circuit 280 (FIG. 1) of the vehicle. A wire bundle 284 having lead wires 286, 288 and an electrical connector 282 extends between the initiator 220 and the circuit 280. The circuit 280 includes a power source 300 and a normally open switch 302. The power source 300 is preferably the vehicle battery but may be a capacitor. The switch 302 is part of a sensor 304 which senses a vehicle situation, such as a collision, in which inflation of the air bag 64 is desired.

When the sensor 304 detects a vehicle situation in which inflation of the air bag 64 is desired, the switch 302 closes. Electrical energy is directed to the initiator 220 over the wire bundle 284. The pyrotechnic material contained in the casing 222 of the initiator 220 ignites. Ignition of the pyrotechnic material produces combustion products which rupture the casing 222 of the initiator 220. The combustion products ignite the gas generating material 200 located in the housing 202 of the inflator 62.

The gas-generating material, when ignited, generates inflation fluid which flows radially outward through the openings 204 of the inflator 62. The inflation fluid impinges on the deflector portion 210 of the mounting hub 66. The deflector portion 210 of the mounting hub 66 shields the inlet portion of the air bag 64 from the hot inflation fluid flowing from the openings 204 in the inflator 62. The deflector portion 210 of the mounting hub 66 also deflects the inflation fluid to flow axially into the inlet portion 244 of the air bag 64.

The inflation fluid then flows into the inflatable portion 242 of the air bag 64. The air bag 64 inflates and is forced against the cover 60. The inflating air bag 64 ruptures the central section 82 of the cover 60 and moves the deployment door panels 80 to pivot outward about the hinge portions 84. The air bag 64 expands outward from the steering wheel 22 past the deployment door panels 80.

The air bag 64 inflates from a folded, uninflated condition, as illustrated in FIG. 1 to a position between the steering wheel 22 and an occupant of the vehicle, such as the driver of the vehicle. The inflated air bag 64 helps to protect the occupant from forcefully striking the steering wheel 22 or other parts of the vehicle.

During inflation of the air bag 64, the vents 146 allow aspiration of ambient air into the air bag from the steering column chamber 144. This aspiration is created by the rapid flow of inflation fluid from the inflator 62 which creates a negative pressure or vacuum within the vents 146. This negative pressure draws ambient air from within the steering column chamber 144 and the mounting hub chamber 142. The ambient air is aspirated into the air bag 64 through the vents to help inflate the air bag 64.

After the air bag 64 is fully inflated and inflation of the air bag is no longer desired, the air bag deflates in a known manner. Part of the inflation fluid from the deflating air bag may flow through the vents 146 in the mounting hub 66 into the mounting hub chamber 142 and steering column chamber 144.

It should be apparent that no fasteners, such as rivets, screws or bolts, or welds are required to attach the air bag 64 or the inflator 62 to the mounting hub 66. Also, no fasteners, such as rivets, screws or bolts, or welds are required to attach the air bag module 24 to the steering wheel 22. Furthermore, no alignment of fastener openings is required since the air bag 64 and the mounting hub 66 have no openings for fasteners such as rivets, screws or bolts to extend through. This feature makes the air bag module 24 particularly suitable for assembly by a robot.

The mounting hub 66 of the air bag module 24 supports both the module and the steering wheel 22 on the steering shaft 26. The steering wheel assembly 20 is secured to the steering shaft 26 with the single fastener 40. Thus, the steering wheel 22 and the air bag module 24 can be installed in a vehicle, as a unit, with minimal assembly steps and associated costs.

After assembly of the air bag module 24, it is relatively difficult to remove the inflator 62 from the mounting hub 66, without using special tools to remove the tabs 208 from the internal groove 184 in the mounting hub 66. Since the air bag 64 hides the manner in which the inflator is attached to the mounting hub 66, theft of the inflator 62 is made difficult.

It is also relatively difficult to remove the steering wheel assembly 20 and/or the air bag module 24 from the steering shaft 26, because the fastener 40 (FIG. 6) has theft or removal resistant features. The fastener 40 includes the body portion 120, the threaded portion 122, a drive head 320 and a frangible portion 322 connecting the body to the drive head. The drive head 320 receives a driving force to screw and unscrew the threaded portion 122 of the fastener 40 from the threaded portion 108 of the fastener opening 106 in the mounting hub 66. The frangible portion 322 breaks to separate the drive head 320 from the body portion 120 upon the application of a driving force above a predetermined driving force. The body portion 120 which remains in the fastener opening 106 engages the surface defining the recess 124 in the steering shaft 26 to retain the steering wheel assembly 20 on the steering shaft. The threaded portion 122 of the fastener 40 is difficult to remove from the threaded portion 108 of the fastener opening 106 in the mounting hub 66 after the frangible portion 322 is broken.

The internal groove 184 for attaching the inflator 62 to the mounting hub 66 is spaced axially downward and radially inward from the external groove 182 of the mounting hub where the air bag 64 is attached to the mounting hub. As a result, during actuation of the inflator 62, the forces applied to the attachment between the inflator and the mounting hub 66 have minimal or no effect on the attachment between the air bag 64 and the mounting hub. Also, during inflation of the air bag 64, the forces transmitted from the air bag to the mounting hub 66 have minimal or no effect on the attachment between the inflator 62 and the mounting hub.

The method of assembling the air bag module 24 of the present invention includes the following steps. A tubular shaped mounting hub 66 is provided to connect the air bag module 24 to a vehicle steering wheel frame 42 and to a vehicle steering shaft 26. An inflator 62 has a housing 202 with a flange 206. The flange 206 includes transversely extending tabs 208 for attaching the inflator 62 to the mounting hub 66.

The inflator 62 is attached to the mounting hub 66 by first placing the inflator at least partially into the tubular portion 68 of the mounting hub. The flange 206 of the inflator 62 engages an upper end surface of the deflector portion 210 of the mounting hub 66, as viewed in FIG. 4. The inflator 62 is moved within the tubular portion 68 of the mounting hub 66 to deflect the tabs 208 on the flange 206 radially inward and axially backward relative to the direction of movement of the inflator. When the inflator 62 is moved to a predetermined position within the tubular portion 68 of the mounting hub 66, such as against the inner shoulder flange 148, at least one of the tabs 208 resiliently expands radially outward into the inner groove 184 in the mounting hub.

The air bag 64 is then attached to the mounting hub 66 by placing a mounting bead 240 of the air bag 64 over the upper end of the mounting hub 66, as viewed in FIG. 4. The bead 240 of the air bag 64 is positioned in an upper section of the outer groove 182 in the mounting hub 66. A wall portion 266 of a guide ring 260 is placed around the bead 240 of the air bag 64 and a base 262 of the guide ring is placed into a lower section of the outer groove 182.

The attaching steps are performed without rotatably aligning the inflator 62 and the air bag 64 relative to the mounting hub 66. Specifically, the parts are merely moved axially relative to each other during assembly. The method of assembly is particularly suitable for robotic assembly because there are no mounting holes or fasteners which would otherwise have to be aligned.

The method also includes the step of determining if the inflator 62 is present and properly positioned within the mounting hub 66. This is done preferably by a robot "looking" with a camera or sensor into the view port 168. If the inflator 62 is not in the mounting hub 66 or if the inflator is not in the predetermined position in the mounting hub, the mounting hub is discarded so that it is not placed in the steering wheel 22.

The method of assembling the air bag module 24 into the steering wheel 22 includes providing a steering wheel frame 42. The mounting hub 66 which connects the steering wheel frame 42 to the steering shaft 26 is provided as part of the air bag module 24. The air bag module 24 is centered in the cavity 86 in steering wheel frame 42 by the leading edge 264 of the guide ring 260. The guide ring 260 guides movement of the air bag module 24 into the cavity 86. The outer shoulder flange 160 of the mounting hub 66 engages a lower end portion 340 (FIG. 6) of the tubular central portion 44 of the frame 42 of the steering wheel 22. The mounting hub 66 is retained in the frame 42 of the steering wheel 22 by deforming tabs 164 on a ring 45 of the frame into the slots 162 in the mounting hub and against end surfaces 166 of the slots.

The central portion 100 of the mounting hub 66 is connected to the steering shaft 26 of the vehicle with a removal resistant fastener 40. The opening 102 in the central portion 100 of the mounting hub 66 receives a portion 104 of the steering shaft 26. The recess 124 in the steering shaft 26 is aligned with the fastener opening 106 in the central portion 100 of the mounting hub 66. The fastener 40 is screwed into the central portion 100 of the mounting hub 66 so a body 120 of the fastener engages a surface of the recess 124 to block relative rotational movement and relative axial movement between the mounting hub 66 and the steering shaft 26.

A drive head 320 is connected to the body 120 at a frangible portion 322. The frangible portion 322 breaks upon a torsional driving force of a predetermined magnitude being applied to the drive head 320 of the fastener 40 when the threaded portion 122 and body 120 can no longer rotate. Applying a driving force to the fastener 40 which is at least as great as the predetermined magnitude breaks the frangible portion 322 and separates the drive head 320 from the body 120. Removal of the portion of the fastener 40 in the central portion 100 of the mounting hub 66 is relatively difficult since the drive head 320 is no longer attached.

From the above description of the invention, those skilled in the art will perceive improvements, changes and modifications in the invention. Such improvements, changes and modifications within the skill of the art are intended to be covered by the appended claims.

Having described the invention, I claim:

1. A module comprising:
   an inflatable vehicle occupant protection device having a mounting portion;
   an actuatable inflator which, upon actuation, provides inflation fluid to inflate said inflatable device;
   a mounting hub for connection with a steering shaft of a vehicle;
   first means for attaching said inflator to said mounting hub at a first location on said mounting hub, said first attaching means including means for defining a first groove in one of said mounting hub and said inflator and a resiliently deflectable tab on the other of said mounting hub and said inflator, said tab being receivable in said first groove; and
   second means for attaching said inflatable device to said mounting hub at a second location on said mounting hub, said second attaching means including a member and means for defining a second groove in said mounting hub, said mounting portion of said inflatable device being receivable in a first section of said second groove, said member having a base portion receivable in a second section of said second groove and a wall portion retaining said mounting portion of said inflatable device in said first section of said second groove.

2. The module of claim 1 wherein said mounting hub comprises a tubular portion for receiving said inflator, said tubular portion of said mounting hub being receivable in a frame of a steering wheel of the vehicle, said mounting hub further comprising a central portion which is connectable with the steering shaft of the vehicle.

3. The module of claim 2 further comprising a frame of a steering wheel of the vehicle and means for connecting said tubular portion of said mounting hub with said frame, said means for connecting comprising an end portion of a first one of said tubular portion of said mounting hub and said frame which is deformable into engagement with an end portion of a second one of said tubular portion of said mounting hub and said frame.

4. The module of claim 3 wherein said deformable end portion comprises at least one tab on said steering wheel frame which is bendable from a first position into a second position in a slot in said tubular portion of said mounting hub.

5. The module of claim 2 wherein said first groove is formed in an inner surface of said tubular portion of said mounting hub and said second groove is formed in an outer surface of said tubular portion of said mounting hub, said second groove being spaced apart axially from said first groove.

6. The module of claim 2 wherein said member comprises a guide ring for guiding movement of said module into the steering wheel frame, said wall portion of said guide ring being disposed radially outward of said tubular portion of said mounting hub and radially outward of said first section of said second groove, said wall portion being slidably engageable with an inner surface of the steering wheel frame to guide movement of said module into the steering wheel frame and to clamp said mounting portion of said inflatable device in said first section of said second groove.

7. An apparatus for connection with a steering shaft of a vehicle, said apparatus comprising:
   a frame for a vehicle steering wheel, said frame having a tubular portion;
   a module receivable in said tubular portion of said frame, said module comprising an inflatable occupant protection device, an inflator for inflating said inflatable device, a mounting hub having a portion connectable with the vehicle steering shaft, first means for connecting said inflator with said mounting hub, and second means for connecting said inflatable device with said mounting hub; and
   means for connecting said mounting hub with said frame, said connecting means comprising an end portion of a first one of said mounting hub and said tubular portion of said frame which is deformable into engagement with an end portion of a second one of said mounting hub and said tubular portion of said frame to secure said mounting hub for movement with said frame.

8. An apparatus as set forth in claim 7 wherein said deformable end portion comprises at least one tab on said first one of said mounting hub and said tubular portion of said frame which is bendable from a first position into a second position in a slot in said second one of said mounting hub and said tubular portion of said frame.

9. An apparatus as set forth in claim 7 wherein said deformable portion comprises a plurality of tabs on a first one of said mounting hub and said tubular portion of said frame, a second one of said mounting hub and said tubular portion of said frame including surfaces defining a plurality of slots, each one of said tabs being movable from a first position into a second position in a respective one of said plurality of slots.

10. An apparatus as set forth in claim 9 wherein the vehicle steering shaft is rotatable about a steering axis, said plurality of tabs being spaced apart on said tubular portion of said steering wheel frame in a circular array centered on said axis, said mounting hub of said module including said surfaces defining a plurality of slots, said tabs when in the first position extending parallel to said axis, said tabs when in the second position extending inward from said tubular portion of said frame in a direction transverse to said axis.

11. An apparatus as set forth in claim 7 further including means for connecting said mounting hub with the vehicle steering shaft, comprising a fastener and surfaces defining a fastener opening in said mounting hub, said fastener opening having a threaded portion;

said fastener having a body portion which is engageable with a surface on the vehicle steering shaft to block movement of said mounting hub relative to the steering shaft when said fastener is received in said fastener opening in said mounting hub;

said fastener having a threaded portion which is engageable in said threaded portion of said fastener opening in said mounting hub;

said fastener having a drive head for receiving a driving force to rotate said fastener in said fastener opening in said mounting hub; and said fastener having a frangible portion disposed intermediate said drive head and said body portion which is frangible upon the application of a driving force to said drive head above a predetermined driving force to enable separation of said drive head from said body portion.

12. A method of assembling a vehicle steering wheel and an air bag module, said method comprising the steps of:

providing a vehicle steering wheel including a frame having a tubular portion;

providing a mounting hub which is connectable with a vehicle steering shaft and which includes a tubular portion;

attaching an inflator within the tubular portion of the mounting hub;

attaching an air bag to the tubular portion of the mounting hub;

positioning the mounting hub in the tubular portion of the steering wheel frame; and retaining the mounting hub in the steering wheel frame by deforming an end portion of a first one of the tubular portion of the frame and the tubular portion of the mounting hub against an end portion of a second one of the tubular portion of the frame and the tubular portion of the mounting hub.

13. A method as set forth in claim 12 wherein the end portion of the tubular portion of the steering wheel frame comprises a plurality of bendable tabs, the end portion of the tubular portion of the mounting hub comprises surfaces defining a plurality of slots, and wherein said retaining step includes the step of bending the tabs on the steering wheel frame into the slots on the mounting hub to block rotational and axial movement of the mounting hub relative to the steering wheel frame.

14. A method as set forth in claim 13 wherein said step of positioning the mounting hub in the tubular portion of the steering wheel frame includes the step of locating a mounting portion of the air bag between the tubular portion of the steering wheel frame and the tubular portion of the mounting hub to clamp the mounting portion of the air bag in position on the mounting hub.

15. A method as set forth in claim 12 wherein said step of attaching an inflator includes the steps of:

moving the inflator axially into the tubular portion of the mounting hub;

deflecting a plurality of tabs on the inflator radially inward while moving the inflator axially within the tubular portion of the mounting hub; and resiliently expanding the plurality of tabs radially outward into a groove in the tubular portion of the mounting hub when the inflator moves to a predetermined position within the mounting hub.

16. A module comprising:

an actuatable inflator which, upon actuation, provides inflation fluid to inflate an inflatable vehicle occupant protection device;

a mounting hub which is connectable with a steering shaft of a vehicle; and means for attaching said inflator to said mounting hub, said attaching means comprising means for defining a groove in a surface of a first one of said mounting hub and said inflator, said attaching means further comprising a plurality of resiliently deflectable tabs on a second one of said mounting hub and said inflator, said tabs deflecting from an initial position upon relative movement of said inflator and said mounting hub toward a predetermined relative position and said tabs returning toward the initial position in said groove upon movement of said inflator and said mounting hub into the predetermined relative position thereby to maintain said inflator and said mounting hub in the predetermined relative position;

said mounting hub having a tubular configuration extending around an axis, said groove extending around an inner peripheral surface of said mounting hub and around said axis, said inflator being disposed at least partially within said mounting hub and said tabs extending radially outward from said inflator into said groove when said inflator and said mounting hub are in the predetermined relative position.

17. A module as set forth in claim 16 wherein said inflator moves in a first direction along said axis upon relative movement of said inflator and said mounting hub toward the predetermined relative position, said tabs extending radially outward and axially in a second direction opposite to said first direction when said inflator and said mounting hub are in the predetermined relative position.

* * * * *